United States Patent
Peng et al.

(10) Patent No.: US 9,801,031 B2
(45) Date of Patent: Oct. 24, 2017

(54) METHOD, APPARATUS AND SYSTEM FOR GROUP SESSION

(71) Applicant: Huawei Technologies Co., Ltd., Shenzhen (CN)

(72) Inventors: Chenghui Peng, Shenzhen (CN); Yuhua Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/805,200

(22) Filed: Jul. 21, 2015

(65) Prior Publication Data

US 2015/0327027 A1 Nov. 12, 2015

Related U.S. Application Data

(63) Continuation of application No. PCT/CN2014/070988, filed on Jan. 21, 2014.

(30) Foreign Application Priority Data

Jan. 21, 2013 (CN) .......................... 2013 1 0021526

(51) Int. Cl.
*H04B 7/00* (2006.01)
*H04W 4/10* (2009.01)
(Continued)

(52) U.S. Cl.
CPC ............ *H04W 4/10* (2013.01); *H04L 45/64* (2013.01); *H04L 65/4061* (2013.01);
(Continued)

(58) Field of Classification Search
CPC ....... H04W 4/10; H04W 76/005; H04W 4/08; H04W 88/16; H04W 8/186;
(Continued)

(56) References Cited

U.S. PATENT DOCUMENTS

| 8,126,493 B2 * | 2/2012 | Wang ..................... H04L 12/56 370/260 |
| 2005/0135374 A1 * | 6/2005 | Isomaki ............ H04M 3/42382 370/395.2 |

(Continued)

FOREIGN PATENT DOCUMENTS

| CN | 101094478 A | 12/2007 |
| CN | 102714628 A | 10/2012 |

(Continued)

OTHER PUBLICATIONS

Office Action in corresponding Chinese Patent Application No. 201310021526.3 (Nov. 2, 2016).

*Primary Examiner* — Shaima Q Aminzay
(74) *Attorney, Agent, or Firm* — Leydig, Voit & Mayer, Ltd.

(57) ABSTRACT

The present invention relates to a method, an apparatus and a system for a group session service in a software defined network, and relates to the field of the wireless communication and particularly to a group session service. By separating service control signaling from service data, the demands for a Push to talk over cellular (PoC) server is low and little change is made on a service flow, no extra demands for a user is needed, the control logic of the group call service is simplified, the load of the PoC server is reduced, and the delay of a multiple-party session is remarkably reduced, thereby effectively improving the QoE of the user.

9 Claims, 6 Drawing Sheets

(51) Int. Cl.
*H04W 8/18* (2009.01)
*H04W 72/12* (2009.01)
*H04L 29/06* (2006.01)
*H04L 12/715* (2013.01)
*H04L 29/12* (2006.01)

(52) U.S. Cl.
CPC ............ *H04L 65/80* (2013.01); *H04W 8/186* (2013.01); *H04W 72/121* (2013.01); *H04L 61/25* (2013.01)

(58) Field of Classification Search
CPC ... H04W 88/184; H04W 12/06; H04W 28/16; H04W 4/12; H04W 4/22; H04W 72/121; H04W 76/00; H04W 88/14; H04W 8/26
USPC ............ 455/518, 519, 3.05, 411; 370/395.2, 370/395.52, 310, 342; 463/40; 709/203
See application file for complete search history.

(56) References Cited

U.S. PATENT DOCUMENTS

| | | | |
|---|---|---|---|
| 2007/0286100 | A1 | 12/2007 | Saaranen et al. |
| 2010/0120463 | A1* | 5/2010 | Wang ...................... H04L 12/56 455/518 |
| 2011/0302289 | A1 | 12/2011 | Shaikh et al. |
| 2011/0317701 | A1 | 12/2011 | Yamato et al. |
| 2013/0332622 | A1 | 12/2013 | Wang |

FOREIGN PATENT DOCUMENTS

| | | | |
|---|---|---|---|
| CN | 103476062 | A | 12/2013 |
| WO | WO 2005064849 | A1 | 7/2005 |
| WO | WO 2012101690 | A1 | 8/2012 |

* cited by examiner

METHOD, APPARATUS AND SYSTEM FOR GROUP SESSION

CROSS-REFERENCE TO RELATED APPLICATIONS

This application is a continuation of International Patent Application No. PCT/CN2014/070988, filed on Jan. 21, 2014, which claims priority to Chinese Patent Application No. 201310021526.3, filed on Jan. 21, 2013, both of which are hereby incorporated by reference in their entireties.

TECHNICAL FIELD

The present invention relates to the field of wireless communications, and in particular to a method and an apparatus for a group session service.

BACKGROUND

With the rapid development of Internet, the scale of Internet becomes larger and larger, applications over Internet becomes more and more complicated, and the requirement for the controllability of Internet becomes higher and higher. In view of this, clean slate research group of Stanford University proposes the network architecture of software defined network (SDN), of which the core technology named OpenFlow realizes flexible control of the network traffic through separating the control plane from the data plane of the network apparatus. OpenFlow is an exchange technology, in which the OpenFlow protocol is configured to establish the software defined network, and the network could be managed and controlled as a whole instead of as lots of standalone apparatus.

The bearer and the control are separated from each other in IP layer or above IP layer in conventional SDN, that is, this mainly involves an improvement on the core network level, and wireless SDN is directed to a solution for separating the control from the bearer in the wireless access network.

The network architecture of wireless SDN is shown in FIG. 1. The wireless SDN separates the control plane from the user plane in the wireless network entity, and realizes the wireless access bearer control based on OpenRadio protocol and the control of the network layer and data transfer based on OpenCore protocol. The wireless SDN includes the control plane and the user plane entities. The control plane includes a Single Network Controller (SNC) and a control-plane of node B (cNB). The user plane includes a Gateway Router (GR) and a user-plane of node B (uNB). SNC is a centralized network control point and controls the data flow routing through OpenCore protocol. cNB realizes wireless resource management of the wireless parameter control on uNB through OpenRadio protocol.

A group session service refers to the multi-people session in the network at present, such as push to talk over cellular (PoC), instant message (IM), and video conference. Taking a PoC service as an example, the PoC service is a push-to-talk service defined by Open Mobile Architecture (OMA) and The 3$^{rd}$ Generation Partnership Project (3GPP) based on the public cellular mobile communication network, and realizes communications similar to a group session through the half duplex VoIP technology. The user only needs to press a key like using an interphone and needs not to dial to enable point-to-multipoint instant communications with multiple users from anywhere quickly and directly.

The functions of respective network elements in a PoC are as follows.

A PoC Client is responsible for login to a PoC service, initiating, participating and terminating a PoC session, coding, decoding, sending and receiving of PoC voice packets, and so on.

A PoC Server is responsible for network functions on the application layer in the PoC service, which are grouped into a controlling PoC function (CPF) and a participating PoC function (PPF). CPF is responsible for centralized processing of PoC sessions, centralized distribution of media, session right arbitration, spokesman identification, processing of SIP sessions, management of information about participants and media, support for centralized billing, translation of media encoding format, etc. PPF is responsible for processing of the PoC sessions, user plane adaptation, relaying the control information of Talk Burst between a PoC client and a Controlling PoC server, processing of the SIP sessions, providing protocol implementation charging reports of session parties and protocol negotiation for session burst sequences for a joined PoC session, and storing existing answer modes and selecting disabled parameters of a join-to PoC session for a PoC client.

Both of the signaling and data in the conventional group session service need to be forwarded by an application server, thus the load of the server is heavy, and implementation cost is high. Also, a high delay of service data is caused, especially in case of one-to-multi session. A private network is used to achieve a low delay for the PoC session service, which results in a large deployment cost for the service provider.

SUMMARY

A group session service based on a wireless SDN is provided according to embodiments of the present invention. By separating service control signaling from data flow, the issues of large delay and high cost in the conventional group session service are addressed.

To achieve the above object, the following technical solutions are provided according to embodiments of the present invention.

A method for a group session includes:

establishing a group session, and generating service information based on the group session;

sending the service information to a Single Network Controller SNC that a calling user homes to, where the service information is to generate a first routing rule by the SNC that the calling user homes to and the first routing rule is sent to a Gateway Router that the calling user homes to;

sending the service information to an SNC that a called user homes to, where the service information is to generate a second routing rule for the SNC that the called user homes to and the second routing rule is sent to a GR that the called user homes to; and sending a session authorization message to the calling user to notify the calling user to send service data, forwarding the service data sent by the calling user to the GR that the called user homes to through the GR that the called user homes to based on the first routing rule, and forwarding the service data to the called user through the GR that the called user homes to.

The process of establishing the group session includes:

receiving a first call invitation message sent from the calling user, and generating address information of the group session, wherein the first call invitation message is to invite the called user to establish the session connection;

sending a second call invitation message to the called user, wherein the second call invitation message carries the address information of the group session; sending a call acceptance message to the calling user, wherein the call acceptance message carries the address information of the group session; and receiving a call acceptance message sent by the called user, and establishing the group session.

The service information includes user identifications of the calling user and called user, and address information of the calling user and the called user, and the address information of the group session, wherein the user identifications of the calling user and called user, the address information of the calling user and the called user, and the address information of the group session are to determine the first routing rule and the second routing rule.

The first routing rule includes: if the source address of service data is the address of the calling user, and the corresponding destination address is the address of the group session, changing the source address of service data to the address of the group session, and changing the corresponding destination address to the address of the called user.

The second routing rule includes: if the source address of service data is the address of the called user, and the corresponding destination address is the address of the group session, changing the source address of service data to the address of the group session, and changing the corresponding destination address to the address of the calling user.

In a case that an expiration is detected or session termination request messages sent by the calling user and the called user are received, sending a session termination message to the SNC that the calling user homes to instruct the SNC that the calling user homes to send a first routing rule deletion message to the GR that the calling user homes to, so the GR that the calling user homes to deletes the first routing rule, wherein the session termination message comprises a session identifier; and sending a session termination message to the SNC that the called user homes to instruct the SNC that the called user homes to send a second routing rule deletion message to the GR that the called user homes to, so the GR that the called user homes to deletes the second routing rule, where the session termination message comprises the session identifier.

A method for a group session includes:

receiving a routing rule sent by an SNC that a calling user homes to, where the routing rule is generated by the SNC that the calling user homes to based on service information from a PoC server, and the service information is generated based on an established group session; and receiving service data from the calling user, and forwarding the service data to a called user based on the routing rule.

The routing rule includes: if the source address of service data is the address of the calling user, and the corresponding destination address is the address of the group session, changing the source address of service data to the address of the group session address, and changing the corresponding destination address to the address of the called user.

A system for a group session includes a PoC server, a Single Network Controller SNC, and a Gateway Router GR.

The PoC server is configured to: establish a group session, and generate service information based on the group session, send the service information to the SNC, send a session authorization message to a calling user to notify the calling user to send service data, where the service data sent from the calling user is forwarded to a called user through the GR based on a routing rule.

The SNC is configured to: receive the service information, generate the routing rule based on the service information and send the routing rule to a GR that the calling user homes to.

The GR is configured to: receive the routing rule sent from the SNC, receive the service data sent from the calling user, and forward the service data to a GR that the called user homes to based on the routing rule, where the service data is further sent to the called user by the GR that the called user homes to.

The service information includes user identifications of the calling user and called user, and address information of the calling user and the called user, and address information of the group session, wherein the user identifications of the calling user and called user, the address information of the calling user and the called user, and the address information of the group session are to determine the routing rule.

The routing rule includes: if the source address of service data is the address of the calling user and the corresponding destination address is the address of the group session, changing the source address of service data to the address of the group session, and changing the corresponding destination address to the address of the called user.

The PoC server is further configured to, in a case that an expiration is detected or session termination request messages sent by the calling user and the called user of the session are received, send a session termination message to an SNC that the calling user homes to, where session termination message includes a session identifier.

The SNC that the calling user homes to is further configured to, receive a session termination message sent from the PoC server, and send a routing rule deletion message to the GR that the called user homes to.

The GR that the calling user homes to is further configured to, delete the routing rule of the session based on the routing rule deletion message sent from the SNC that the calling user homes to.

An apparatus for a group session includes:

a group session establishing unit, configured to establish a group session;

a service information generating unit, configured to generate service information based on the group session; and a sending unit, configured to: send the service information to an SNC that a calling user homes to, where the service information is to generate a first routing rule by that the calling user homes to, and the first routing rule is sent to a GR that the calling user homes to; send the service information to the SNC that a called user homes to, where the service information is to generate a second routing rule by the SNC that the called user homes to, and the second routing rule is sent to the GR that the called user homes to;

where the sending unit is further configured to send a session authorization message to the calling user to notify the calling user to send service data, where the service data is forwarded to the GR that the called user homes to through the GR that the calling user homes to based on the first routing rule, and the service data is forwarded to the called user by the GR that the called user homes to.

The group session establishing unit includes:

a receiving module, configured to receive a first call invitation message sent from the calling user, where the first call invitation message is to invite a called user to establish the group session;

a group session address generating module, configured to generate address information of the group session; and a sending module, configured to: send a second call invitation message to the called user, where the second call invitation message carries the address information of the group session; send a call acceptance message to the calling user, where the call acceptance message carries the address information of the group session;

where the receiving module is further configured to receive a call acceptance message sent by the called user.

The service information includes user identifications of the calling user and called user, and address information of the calling user and the called user, and the address information of the group session. The user identifications of the calling user and called user, the address information of the calling user and the called user, and the address information of the group session are to determine the first routing rule and second routing rule.

The first routing rule includes: if the source address of service data is the address of the calling user and the corresponding destination address is the address of the group session, changing the source address of service data to the address of the group session, and changing the corresponding destination address to the address of the called user.

The second routing rule includes: if the source address of service data is the address of the called user and the corresponding destination address is the address of the group session, changing the source address of service data to the address of the group session, and changing the corresponding destination address to the address of the calling user.

The apparatus for a group session further includes:

a session termination unit, configured to, in a case that an expiration is detected or session termination request messages sent from the calling user and the called user are received, send a session termination message to the SNC that the calling user homes to instruct the SNC that the calling user homes to send a first routing rule deletion message to the GR that the calling user homes to, so the GR that the calling user homes to deletes the first routing rule, where the session termination message includes a session identifier; and send a message of session termination to the SNC that the called user homes to, to instruct the SNC that the called user homes to send a second routing rule deletion message to the GR that the called user homes to, so the GR that the called user homes to deletes the second routing rule, where the session termination message includes the session identifier.

An apparatus for a group session includes:

a receiving unit, configured to receive a routing rule sent from an SNC that a calling user homes to, where the routing rule is generated by the SNC that the calling user homes to based on service information from a PoC server, and the service information is generated based on the established group session; and a forwarding unit, configured to forward service data from the calling user to a called user based on the routing rule.

The routing rule includes: if the source address of service data is the address of the calling user, and the corresponding destination address is the address of the group session address, changing the source address of service data to the address of the group session, and changing the corresponding destination address to the address of the called user.

A method, an apparatus and a system for a group session in a wireless software defined network are provided according to the embodiments of the present invention. By separating service control signaling from service data, the demands for a PoC server is low, and little change is made on a service flow. So no extra demands for a user is needed, the control logic of the group session service is simplified, the load of the PoC server is reduced, the delay of the group session service data is reduced, and the delay is reduced more apparently in case of multiple-user session, thereby the QoE of the user is improved effectively.

DETAILED DESCRIPTION

To make the objects, technical solutions and merits of the present invention more clearly, the embodiments of the present invention are further illustrated in detail hereinafter in conjunction with the drawings. Apparently, the described embodiments are only a few rather than all of the embodiments of the present invention. All other embodiments obtained by those skilled in the art based on the embodiments of the present invention without creative effort fall within the protection scope of the invention.

It should be understood that the technical solutions according to the embodiments of the invention may be applied to various group session services, e.g., PoC, IM, and video conference.

Exemplary embodiments of the present invention are described in more detail below.

The First Embodiment

Figure 1:
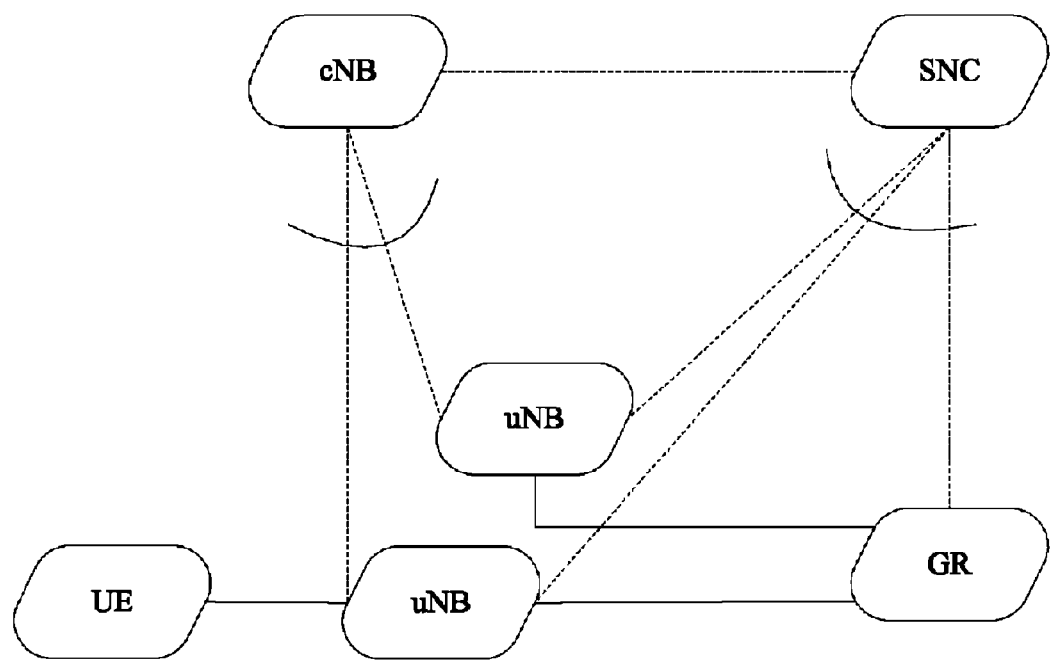
FIG. 1 is a network architecture diagram of a wireless SDN.
Figure 2:
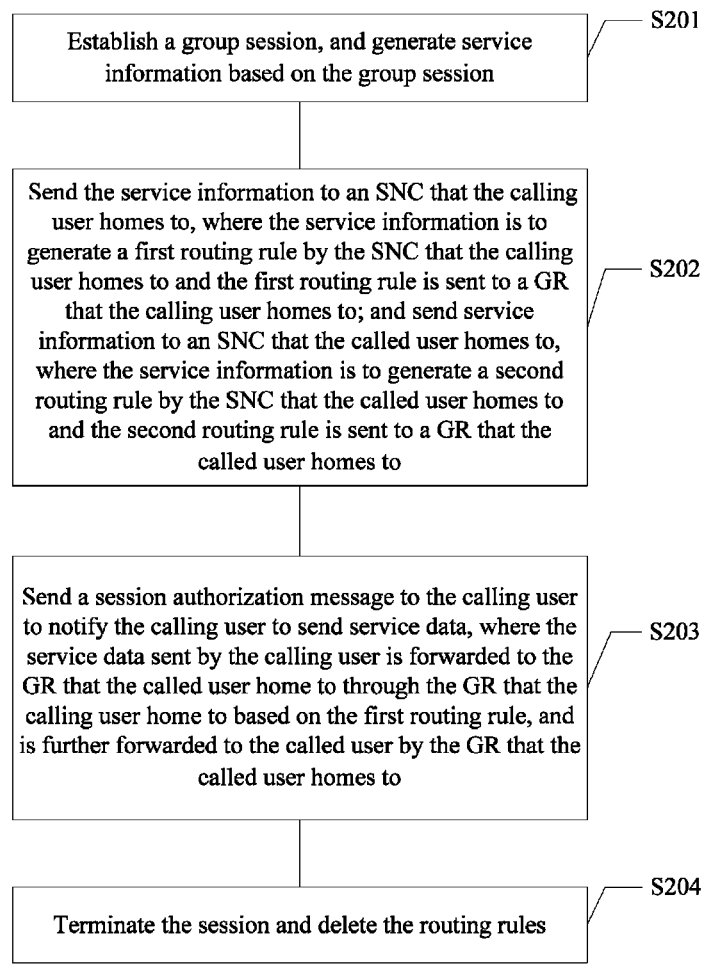
FIG. 2 is a flowchart of a group session according to an embodiment of the present invention.

FIG. 2 is a flowchart of a group session according to an embodiment of the present invention. The method includes steps S201 to S204.

In step S201, a session is established, and service information is generated based on the group session.

A PoC server receives a first call invitation message sent from a calling user, and generates address information of the group session. The first call invitation message is to invite a called user to establish the group session.

The PoC server sends a second call invitation message to the called user, and the second call invitation message carries the address information of the group session. The PoC server sends a call acceptance message to the calling user, and the call acceptance message carries the address information of the group session.

The PoC server receives the call acceptance message sent from the called party, and the group session is established.

Specifically, in a one-to-multi group session, on receiving the call invitation message sent from the calling user, the PoC server generates the address information of the group session, sends the second call invitation message to all called users. In a case that the PoC server receives the call acceptance message from at least one called user, the PoC server establishes the group session.

In step S202, the service information is sent to an SNC that the calling user homes to, where the service information is to generate a first routing rule by the SNC that the calling user homes to and the first routing rule is sent to a GR that the calling user homes to; and service information is sent to an SNC that the called user homes to, where the service information is to generate a second routing rule by the SNC that the called user homes to and the second routing rule is sent to a GR that the called user homes to.

Specifically, the service information includes user identifications of the calling user and the called user, and address information of the calling user and the called user, and the address information of the group session. The user identifications of the calling user and the called user, and the address information of the calling party and the called party, and the address information of the group session are to make the first routing rule and the second routing rule.

Specifically, the first routing rule includes: if the source address of service data is the address of the calling user and the corresponding destination address is the address of the group session, changing the source address of service data to the address of the group session, and changing the corresponding destination address to the address of the called user.

The second routing rule includes: if the source address of service data is the address of the called user and the corresponding destination address is the address of the group session, changing the source address of service data to the address of the group session, and changing the corresponding destination address to the address of the calling user.

In step S203, a session authorization message is sent to the calling user to notify the calling user to send service data, and the service data sent by the calling user is forwarded to the GR that the called user home to through the GR that the calling user home to based on the first routing rule, and is further forwarded to the called user by the GR that the called user homes to.

Specifically, the PoC server sends the session authorization message to the calling user, and sends a session occupancy message to the called user. The calling user sends service data to the GR that the calling user homes to, the GR that the calling user homes to forwards the service data to the GR that the called user homes to based on the first routing rule, and the GR that the called user homes to sends the service data to the called user based on the second routing rule.

On receiving a session release message sent by the calling user, the PoC server sends a session idle message to the calling user and called user. The PoC server receives a session request message sent by the called user, and sends a session authorization message to the called user and a session occupancy message to the calling user. The called user sends service data to the calling user.

In step S204, the session is terminated, and the routing rules are deleted.

Specifically, in a case that an expiration is detected or session termination request messages sent by the calling user and the called user are received, the PoC server sends a session termination message to the SNC that the calling user homes to, to instruct the SNC that the calling user homes to send a first routing rule deletion message to the GR that the calling user homes to, so that the GR that the calling user homes to deletes the first routing rule, where the session termination message includes a session identifier; Also, the PoC server sends a session termination message to the SNC that the called user homes to instruct the SNC that the called user homes to send a second routing rule deletion message to the GR that the called user homes to, so that the GR that the called user homes to deletes the second routing rule, where the session termination message includes the session identifier.

In the method for a group session according to the embodiment of the present invention, the demands for a PoC server is low and the load of the PoC server is reduced by separating service control signaling from service data.

The Second Embodiment

Figure 3:
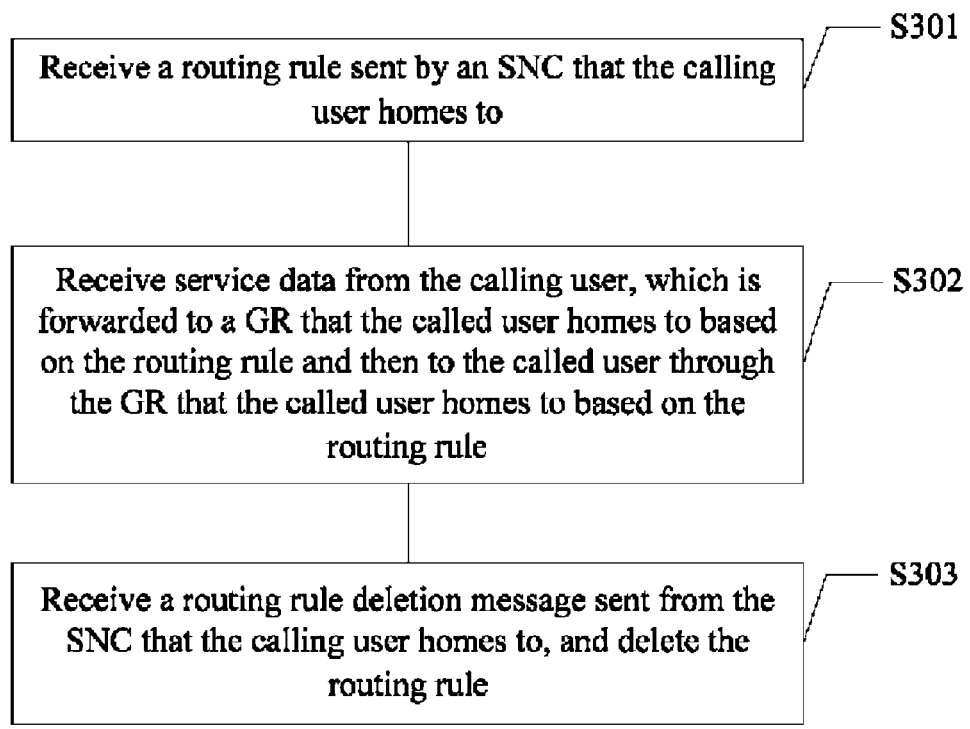
FIG. 3 is a flowchart of a group session according to an embodiment of the present invention.

FIG. 3 is a flowchart of a group session according to another embodiment of the present invention. The method includes steps S301 to S303.

In step S301, a routing rule sent by an SNC that the calling user homes to is received.

Specifically, a PoC server receives a call invitation message sent from a calling user, generates address information of the group session, sends a call invitation message carrying the address information of the group session to a called user, and sends a call acceptance message carrying the address information of the group session to the calling user, then a group session is established.

The SNC that the calling user homes to receives service information sent by the PoC server, and generates a routing rule based on the service information. The routing rule includes: if the source address of service data is the address of the calling user and the corresponding destination address is the address of the group session, changing the source address of the service data to the address of the group session, and changing the corresponding destination address to the address of the called user.

A GR that the calling user homes to receives the routing rule sent from the SNC that the calling user homes to.

In step S302, service data from the calling user is received, and forwarded to the called user based on the routing rule.

In step S303, a routing rule deletion message sent from the SNC that the calling user homes to is received, and the routing rule is deleted.

In a case that an expiration is detected by the PoC server or session termination request messages sent by the calling user and called user are received, the PoC server sends a session termination message to the SNC that the calling user homes to, to instruct the SNC that the calling user homes to send a routing rule deletion message to the GR that the calling user homes to, so that the GR that the calling user homes to deletes the routing rule, where the session termination message includes a session identifier.

In the method for a group session according to the embodiment of the present invention, by separating service control signaling from service data, little change is made on a service flow, the control logic of the group session is simplified, and the delay of the group session service data is reduced, especially in case of multiple-party session, thereby the QoE of the user is improved effectively.

The Third Embodiment

Figure 4:
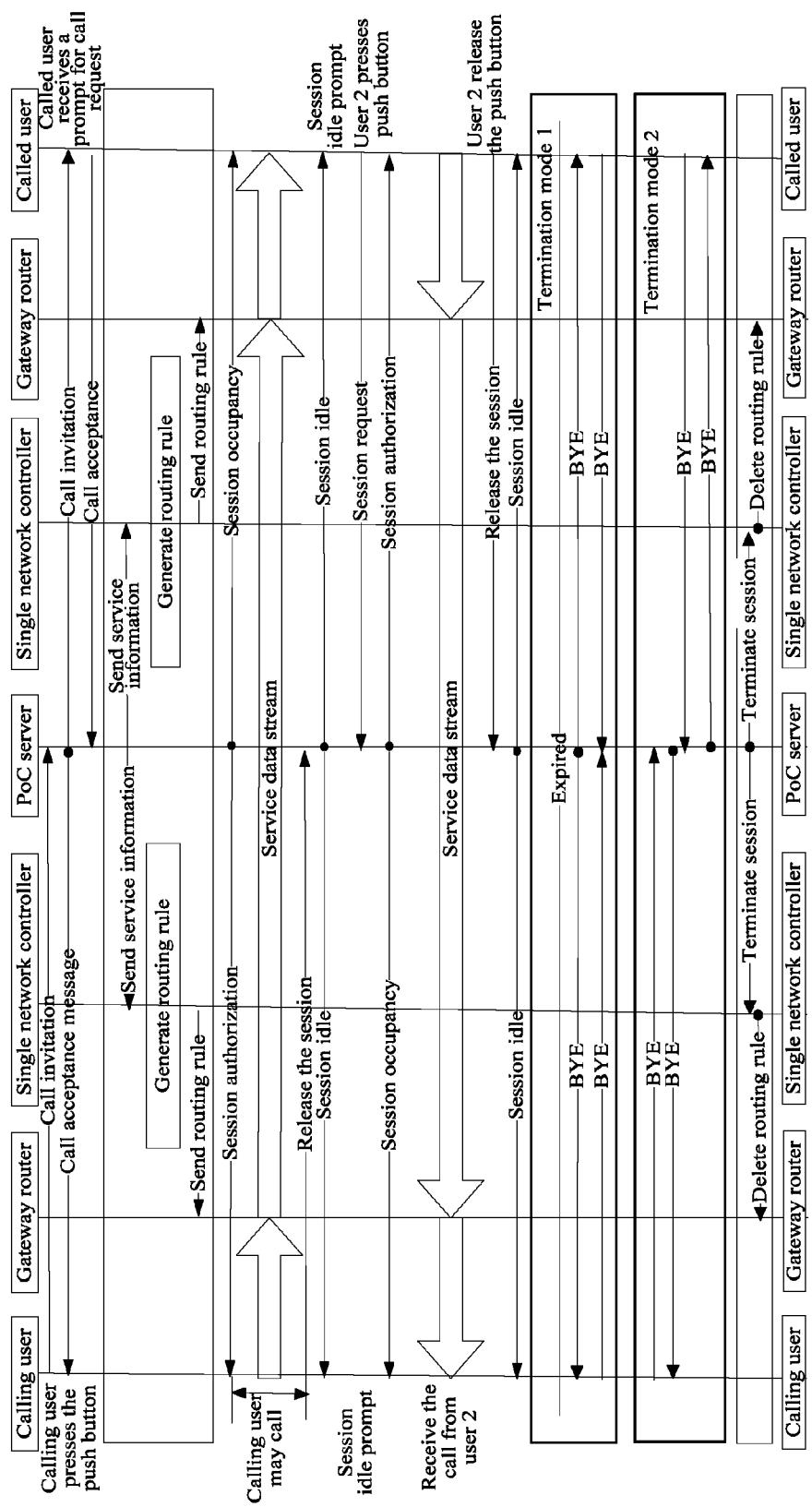
FIG. 4 is a signaling diagram of a group session service according to an embodiment of the present invention.

FIG. 4 is a signaling diagram of a group session service according to an embodiment of the present invention. As shown in FIG. 4, the method includes four sections.

The first section relates to service session initiation.

A calling user sends a call invitation message to a PoC server, requesting for initiating a group session. On receiving the call invitation message, the PoC server generates address information of the group session, sends a call invitation message carrying the address information of the group session to a called user and a call acceptance message carrying the address information of the group session to the calling user. On receiving a call acceptance message from the called user, the PoC server goes to the second section.

The second section relates to routing decisions and rules issuing.

The PoC server sends service information to an SNC that the calling user homes to, where the service information includes user identifications of the calling user and the called user, address information of the calling user and the called user, media information, a session identifier and address information of the group session. The service information is to generate a first routing rule by the SNC that the calling user homes to. The service information includes an IP addresses, a port number, and a MAC address. The media information includes an encoding format.

The SNC that the calling user homes to generates the first routing rule based on the service information, and issues the first routing rule to a GR that the calling user homes to.

The first routing rule includes: if the source address of service data is the address of the calling user and the corresponding destination address is the address of the group session, changing the source address of the service data to the address of the group session, and changing the corresponding destination address to the address of the called user.

The PoC server sends service information to the SNC that the called user homes to, where the service information includes the user identifications of the calling user and the called user, the address information of the calling user and called user, the media information, the session identifier and the address information of the group session.

The SNC that the called user homes to generates a second routing rule based on the service information, and issues the second routing rule to the GR that the calling user homes to.

The second routing rule includes: if the source address of service data is the address of the called user and the corresponding destination address is the address of the group session, changing the source address of the service data to the address of the group session, and changing the corresponding destination address to the address of the calling user.

The third section relates to user session.

The PoC server authorizes a session to the calling user, and the service data sent by the calling user is forwarded to the GR that the called user homes to through the GR that the calling user homes to based on the first routing rule, and the GR that the called user homes to sends the data to the called party. The calling user sends a session release message to the PoC server, and the PoC server sends a session idle message to the calling user and called user, so both of the calling user and the called user are in a session idle state. The called user sends a session request message, the PoC server sends a session authorization message to the called user and a session occupancy message to the calling user, and the service data is sent by the called user and forwarded to the GR that the calling user homes to through the GR that the called user homes to, and is further sent to the calling user by the GR that the calling user homes to based on the first routing rule. The called user sends a session release message to the PoC server, and the PoC server sends a session idle message to the calling user and called user, so both of the calling user and called user are in a session idle state.

The fourth section relates to session termination and deletion of routing rules.

In a case that an expiration is detected or session termination request messages from respective parties of the session are received by the PoC server, the PoC server sends a session termination message to the SNC that the calling user homes to and SNC that the called user homes to, and the session termination message includes the session identifier.

Specifically, the PoC server monitors the session, and in a case that the session is in an idle state and no session request from respective parties of the session is received within a predetermined period of time, the PoC server determines as the expiration.

The SNC that the calling user homes to sends a routing rule deletion message to the GR that the calling user homes to, to instruct the GR that the calling user homes to delete the routing rule related to the session, and the SNC that the called user homes to sends a routing rule deletion message to the GR of that the called user homes to, to instruct the GR that the called user homes to delete the routing rule related to the session.

In the method for a group session according to the embodiment of the, by separating service control signaling from service data, the demands for the PoC server is low, so little change is made on a service flow, no extra demands for a user is needed, the control logic of the group session service is simplified, the load of the PoC server is reduced, and the delay of the group session service data is reduced, especially in case of multiple-party session, thereby the QoE of the user is improved effectively.

The Fourth Embodiment

A method for a one-to-multi group session is provided according to the embodiment of the present invention. The method includes four sections.

The first section relates to service session initiation.

It is similar to the one-to-one call in the first embodiment, and the difference is that, on receiving a call invitation message sent from a calling user, a PoC server generates address information of a group session, sends a call invitation message carrying the address information of group session to all called users and a call invitation acceptance message carrying the address information of group session to the calling user. The PoC server waits until at least one called user returns a call acceptance message, then the PoC server goes to a second section.

The second section relates to routing decisions and rules issuing.

Being the same as the first embodiment, the PoC server sends service information to an SNC that the calling user homes to and an SNC that the called user homes to, and the Nth SNC that the Nth user homes to generates a Nth routing rule based on the service information, where $N=1, 2 \ldots$.

The Nth routing rule includes: if the source address of service data is the address of the Nth user and the corresponding destination address is the address of the group session, making multiple copies of the data, changing the source address of the service data to the address of the group session, and changing the corresponding destination address of respective pieces of data to the addresses of other users participating in the group session.

The Nth SNC sends the Nth routing rule to a GR that the Nth user homes to.

The third section relates to user session.

The PoC server sends a session authorization message to the calling user, the GR that the calling user homes to makes multiple copies of the service data from the calling user, and forwards the data to the GR that other called users home to in the group session based on the routing rules, then the data is sent to the corresponding called users by the GRs that the called users home to.

The fourth section relates to session termination and deletion of routing rules.

Being the same as the first embodiment, in a case that an expiration is detected or session termination request messages from respective users of the session are received by the PoC server, the PoC server notifies the SNCs that respective users home to in the group session to delete the session, and the SNCs notify the corresponding GRs to delete the routing rules of the session.

In the method for a one-to-multi group session according to the embodiment of the present invention, by separating service control signaling from service data, the delay of the group session service data is reduced, especially in case of multiple-user session, thereby the QoE of the user is improved effectively.

The Fifth Embodiment

Figure 5:
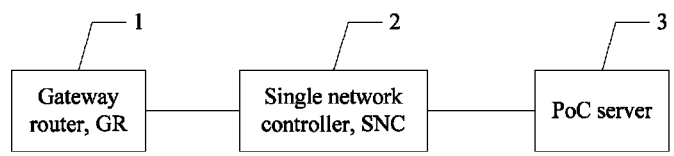
FIG. 5 is a diagram of a group session system according to an embodiment of the present invention.

FIG. 5 is a diagram of a group session system according to an embodiment of the present invention. As shown in FIG. 5, the system includes a PoC server 3, an SNC 2 and a GR 1.

The PoC server 3 is configured to: establish a session connection and generate service information based on the session connection, send the service information to a Single Network Controller SNC 2, send a session authorization message to a calling user, notify the calling user to send service data, where the service data sent by the calling user is forwarded to a called user through a Gateway Router GR 1 based on a routing rule;

The service information includes user identifications of the calling user and the called user, and address information of the calling user and the called user, and address information of the group session. The user identifications of the calling user and the called user, and the address information of the calling user and the called user, and the address information of the group session are to determine the routing rule.

Specifically, the routing rule includes: if the source address of service data is the address of the calling user and the corresponding destination address is the address information of the group session, changing the source address of service data to the address information of the group session, and changing the corresponding destination address to the address of the called user.

The PoC server 3 is further configured to, in a case that an expiration for the session connection is detected or session termination request messages from both users of the session are received, send a session termination message to SNC 2 that the calling user homes to, where the session termination message includes a session identifier.

The SNC 2 is configured to receive the service information, generate the routing rule based on the service information, and send the routing rule to the GR.

The SNC 2 is further configured to receive the message termination message sent from the PoC server 3, and send a routing rule deletion message to the GR 1.

The GR 1 is configured to receive the routing rule sent from the SNC and the service data sent from the calling user, and forward the service data to the called user based on the routing rule.

The GR 1 is further configured to delete the routing rule of the session based on the routing rule deletion message sent from the SNC 2.

In the group session system according to the embodiment of the present invention, by separating service control signaling from service data, the demands for a PoC server is low, and little change is made on a service flow, so no extra demands for a user is needed, the control logic of the group session service is simplified, the load of the PoC server is reduced, and the delay of the group session service data is reduced, thereby the QoE of the user is improved effectively.

The Sixth Embodiment

Figure 6:
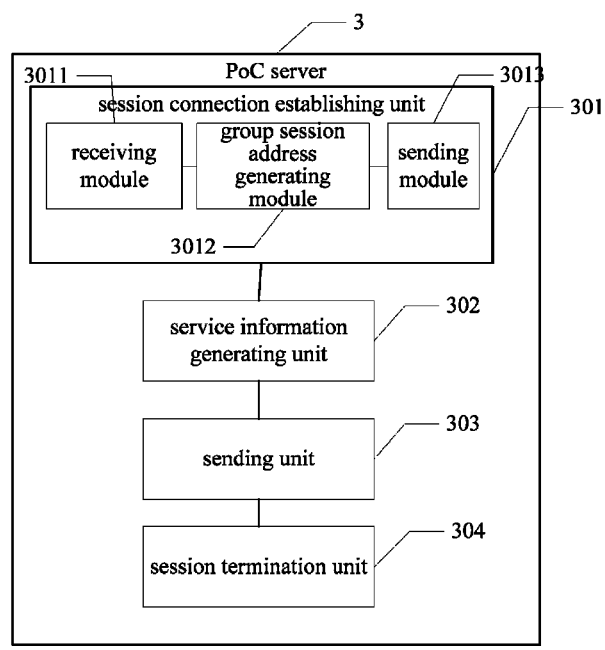
FIG. 6 is a diagram of a group session apparatus according to an embodiment of the present invention.

FIG. 6 is a diagram of a group session apparatus according to an embodiment of the present invention. As shown in FIG. 6, the apparatus includes a session connection establishing unit 301, a service information generating unit 302, a sending unit 303 and a session termination unit 304.

The session connection establishing unit 301 is configured to establish a session connection.

Specifically, the session connection establishing unit includes a receiving module 3011, a group session address generating module 3012 and a sending module 3013.

The receiving module 3011 is configured to receive a first call invitation message sent from a calling user, where the first call invitation message is to invite a called user to establish a group session.

The group session address generating module 3012 is configured to generate address information of the group session.

The sending module 3013 is configured to: send a second call invitation message to the called user, where the second call invitation message carries the address information of the group session; send a call acceptance message to the calling user, where the call acceptance message carries the address information of the group session.

The receiving module is configured to receive the call acceptance message sent by the called user.

The service information generating unit 302 is configured to generate service information based on the session connection.

Specifically, the service information includes user identifications of the calling user and the called user, and address information of the calling user and the called user, and address information of the group session. The user identifications of the calling user and the called user, and the address information of the calling user and the called user, and the address information of the group session are to determine a first routing rule and a second routing rule.

Specifically, the first routing rule includes: if the source address of service data is the address information of the calling user and the corresponding destination address is the address information of the group session, changing the source address of service data to the address information of the group session address, and changing the corresponding destination address to the address information of the called user.

The second routing rule includes: if the source address of service data is the address information of the called user and the corresponding destination address is the address information of the group session, changing the source address of service data to the address information of the group session, and changing the corresponding destination address to the address of information the calling user.

The sending unit 303 is configured to send the service information to an SNC that the calling user homes to, where the service information is to generate the first routing rule by the SNC that the calling user homes to and the first routing rule is sent to a GR that the calling user homes to; send the service information to an SNC that the called user homes to, where the service information is to generate the second routing rule by the SNC that the called user homes to and the second routing rule is sent to a GR that the called user homes to.

The sending unit is further configured to send a session authorization message to the calling user, to notify the calling user to send service data, where the service data is forwarded to the GR that the called user homes to through the GR that the calling user homes to based on the first routing rule, and is further forwarded to the called user by the GR that the called user homes to.

The session termination unit 304 is configured to, in a case that an expiration is detected or session termination request messages sent from the calling user and the called user is received, send a session termination message to the SNC that the calling user homes to, to instruct the SNC that the calling user homes to send a first routing rule deletion message to the GR that the calling user homes to, so the GR that the calling user homes to deletes the first routing rule, where the session termination message includes a session identifier; and send a session termination message to the SNC that the called user homes to, to instruct the SNC that the called user homes to send a second routing rule deletion message to the GR that the called user homes to, so the GR that the called user homes to deletes the second routing rule, where the session termination message includes the session identifier.

In a group session apparatus according to the embodiment of the present invention, by separating service control signaling from service data, the demands for a PoC server is low, and little change is made on a service flow, so no extra demands for a user is needed, the control logic of the group session service is simplified, the load of the PoC server is reduced, and the delay of the group session service data is reduced, thereby the QoE of the user is improved effectively.

The Seventh Embodiment

Figure 7:
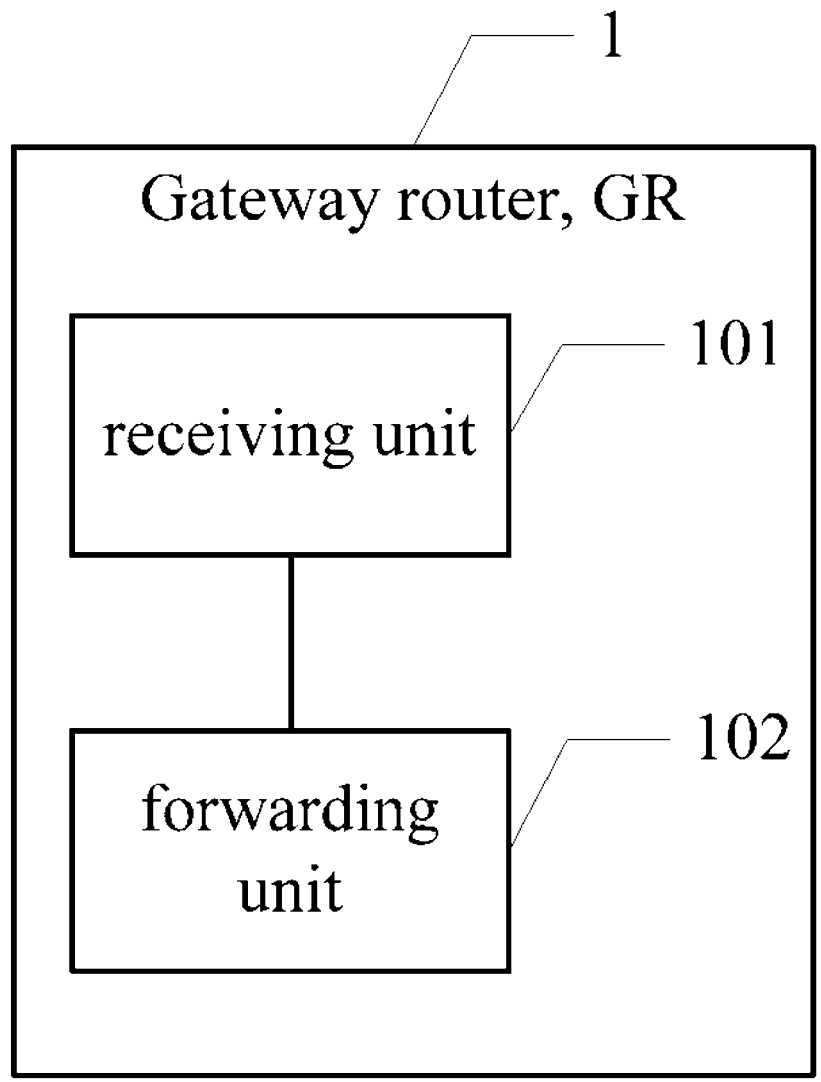
FIG. 7 is a diagram of a group session apparatus according to another embodiment of the present invention.

FIG. 7 is a diagram of a group session apparatus according to another embodiment of the present invention. The apparatus includes a receiving unit 101 and a forwarding unit 102.

The receiving unit 101 is configured to receive a routing rule sent from an SNC that the calling user homes to, where the routing rule is generated by the SNC that the calling user homes to based on service information from a PoC server, and the service information is generated based on an established session connection.

The forwarding unit 102 is configured to forward service data from the calling user to a called user based on the routing rule.

Specifically, the routing rule includes: if the source address of service data is address information of the calling user and the corresponding destination address is address information of the group session, changing the source address of service data to the address information of the group session, and changing the corresponding destination address to the address information of the called user.

In a group session apparatus according to the embodiment of the disclosure, by separating service control signaling from service data, the demands for a PoC server is low, and little change is made on a service flow, so no extra demands for a user is needed, the control logic of the group session service is simplified, the load of the PoC server is reduced, the delay of the group session service data is reduced, especially in case of multiple-party session, thereby the QoE of the user is improved effectively.

What is claimed is:

1. A method for a group session, comprising:
   establishing a session connection between a sender and a recipient, and generating service information based on the session connection;
   sending the service information to a sender Single Network Controller (SNC), wherein the service information is to generate a first routing rule by the sender SNC, and sending the first routing rule to a sender Gateway Router (GR);
   sending the service information to a recipient SNC, wherein the service information is to generate a second routing rule by the recipient SNC, and sending the second routing rule to a recipient GR; and
   sending a session authorization message to the sender, to notify the sender to send the service data, wherein the service data sent from the sender is forwarded directly to the recipient GR by the sender GR based on the first routing rule, and is further forwarded to the recipient by the recipient GR,
   wherein the first routing rule comprises: if the source address of service data is the address information of the sender and the corresponding destination address is the address information of the group session, changing the source address of service data to the address information of the group session, and changing the corresponding destination address to the address information of the recipient; and
   wherein the second routing rule comprises: if the source address of service data is the address information of the recipient and the corresponding destination address is the address information of the group session, changing the source address of service data to the address information of the group session, and changing the corresponding destination address to the address information of the sender.

2. The method according to claim 1, wherein the process of establishing the session connection comprises:
   receiving a first call invitation message sent from the sender, and generating address information of the group session, wherein the first call invitation message is to invite the recipient to establish the session connection;
   sending a second call invitation message to the recipient, wherein the second call invitation message carries the address information of the group session; sending a call acceptance message to the sender, wherein the call acceptance message carries the address information of the group session; and
   receiving a call acceptance message sent by the recipient, and establishing the session connection.

3. The method according to claim 1, wherein the service information comprises user identifications of the sender and recipient, and address information of the sender and the recipient, and the address information of the group session, wherein the user identifications of the sender and recipient, the address information of the sender and the recipient, and the address information of the group session are to determine the first routing rule and the second routing rule.

4. The method according to claim 1, further comprising:
   in a case that an expiration for the session connection is detected, or session termination request messages sent from the sender and recipient are received,
   sending a session termination message to the sender SNC to instruct the sender SNC-to send a first routing rule deletion message to the sender GR, so the sender GR deletes the first routing rule, wherein the session termination message comprises a session identifier; and sending a session termination message to the recipient SNC to instruct the recipient SNC to send a second routing rule deletion message to the recipient GR, so the recipient GR deletes the second routing rule, where the session termination message comprises the session identifier.

5. The method according to claim 2, wherein the service information comprises user identifications of the sender and recipient, and address information of the sender and the recipient, and the address information of the group session, wherein the user identifications of the sender and recipient, the address information of the sender and the recipient, and the address information of the group session are to determine the first routing rule and the second routing rule.

6. An apparatus for a group session, comprising a processor and a transceiver, wherein the processor is configured to:

establish a session connection; and generate service information based on the session connection; and wherein the transceiver is configured to send the service information to a sender SNC, wherein the service information is to generate a first routing rule by the sender SNC, and the first routing rule is sent to a sender GR; and send the service information to a recipient SNC, wherein the service information is to generate a second routing rule by the recipient SNC, and the second routing rule is sent to a recipient GR; and send a session authorization message to the sender, to notify the sender to send the service data, wherein the service data is forwarded directly to the recipient GR by the sender GR based on the first routing rule, and is forwarded to the recipient by the recipient GR, wherein the first routing rule comprises: if the source address of service data is the address information of the sender and the corresponding destination address is the address information of the group session, changing the source address of service data to the address information of the group session, and changing the corresponding destination address to the address information of the recipient; and wherein the second routing rule comprises: if the source address of service data is the address information of the recipient and the corresponding destination address is the address information of the group session changing the source address of service data to the address information of the group session, and changing the corresponding destination address to the address information of the sender.

7. The apparatus according to claim 6, wherein the transceiver is further configured to:

receive a first call invitation message sent from the sender, wherein the first call invitation message is to invite the recipient to establish the group session;

wherein the process is further configured to generate address information of the group session; and wherein the transceiver is further configured to send a second call invitation message to the recipient, wherein the second call invitation message carries the address information of the group session; send a call acceptance message to the sender, wherein the call acceptance message carries the address information of the group session; and receive a call acceptance message sent by the recipient.

8. The apparatus according to claim 6, wherein the service information comprises user identifications of the sender and recipient, address information of the sender and the recipient, and address information of the group session, wherein the user identifications of the sender and recipient, the address information of the sender and the recipient, and the address information of the group are to determine the first routing rule and the second routing rule.

9. The apparatus according to claim 6, wherein the transceiver is further configured to:

in a case that an expiration is detected or session termination request messages sent from the sender and recipient are received, send a session termination message to the sender SNC, to instruct the sender SNC to send a first routing rule deletion message to the sender GR, so the sender GR deletes the first routing rule, where the session termination message comprises a session identifier; and send the message of session termination to the recipient SNC, to instruct the recipient SNC to send a second routing rule deletion message to the recipient GR, so the recipient GR deletes the second routing rule, where the session termination message comprises the session identifier.

* * * * *